(12) United States Patent
Theobald et al.

(10) Patent No.: US 9,911,218 B2
(45) Date of Patent: Mar. 6, 2018

(54) SYSTEMS AND METHODS FOR SPEECH ANIMATION USING VISEMES WITH PHONETIC BOUNDARY CONTEXT (71) Applicant: Disney Enterprises, Inc., Burbank, CA (US)

(72) Inventors: Barry-John Theobald, Burbank, CA (US); Margaret Meyerhofer, Burbank, CA (US); Iain Matthews, Pittsburgh, PA (US); Sarah Taylor, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 48 days.

(21) Appl. No.: 14/956,119

(22) Filed: Dec. 1, 2015

(65) Prior Publication Data

US 2017/0154457 A1    Jun. 1, 2017

(51) Int. Cl.
*G06T 13/40* (2011.01)
*G06T 13/20* (2011.01)
*G10L 15/187* (2013.01)
*G06T 13/80* (2011.01)
*G10L 15/02* (2006.01)

(52) U.S. Cl.
CPC ............ *G06T 13/205* (2013.01); *G06T 13/40* (2013.01); *G06T 13/80* (2013.01); *G10L 15/187* (2013.01); *G10L 2015/022* (2013.01)

(58) Field of Classification Search
None
See application file for complete search history.

(56) References Cited

U.S. PATENT DOCUMENTS

2009/0231347 A1*  9/2009  Omote .................. G06T 13/205
                                                                  345/473
2010/0085363 A1*  4/2010  Smith ..................... G06T 13/40
                                                                  345/473

OTHER PUBLICATIONS

Ezzat, Tony, and Tomaso Poggio. "Miketalk: A talking facial display based on morphing visemes." Computer Animation 98. Proceedings. IEEE, 1998.*
Taylor, Sarah L., et al. "Dynamic units of visual speech." Proceedings of the 11th ACM SIGGRAPH/Eurographics conference on Computer Animation. Eurographics Association, 2012.*

* cited by examiner

*Primary Examiner* — Ryan M Gray
(74) *Attorney, Agent, or Firm* — Sheppard Mullin Richter & Hampton LLP (57) ABSTRACT

Speech animation may be performed using visemes with phonetic boundary context. A viseme unit may comprise an animation that simulates lip movement of an animated entity. Individual ones of the viseme units may correspond to one or more complete phonemes and phoneme context of the one or more complete phonemes. Phoneme context may include a phoneme that is adjacent to the one or more complete phonemes that correspond to a given viseme unit. Potential sets of viseme units that correspond with individual phoneme string portions may be determined. One of the potential sets of viseme units may be selected for individual ones of the phoneme string portions based on a fit metric that conveys a match between individual ones of the potential sets and the corresponding phoneme string portion.

26 Claims, 5 Drawing Sheets

SYSTEMS AND METHODS FOR SPEECH ANIMATION USING VISEMES WITH PHONETIC BOUNDARY CONTEXT

FIELD OF THE DISCLOSURE

This disclosure relates to speech animation using visemes with phonetic boundary context.

BACKGROUND

Speech animation may require moving a jaw, lips, teeth and/or tongue of a facial model in synchrony with some accompanying audio, sometimes referred to as lip-syncing. Some approaches to speech animation may use visual movement parameters of the jaw, lips, teeth, tongue, and/or other facial features that represent speech sounds. Some techniques may use machine learning or probabilistic modeling techniques, such as hidden Markov models (HMMs) and/or hidden semi-Markov models (HSMMs). The models may be based on phonemes, which describe the acoustic sounds of a language.

SUMMARY

One aspect of the disclosure relates to a system configured for speech animation using visemes with phonetic boundary context. Phonetic boundary context may account for viseme unit boundaries that partially span a phoneme. The introduction of phonetic context may improve the way in which viseme units may be selected for an input phoneme strings in real time or near real time. The improvements may include processing load reduction, combinations of viseme units producing facial movement which is smoother and more closely resembles human facial movement during speech, and/or other improvements. Individual viseme units may be usable for one or more animation entities (e.g., animated characters) using an underlying mesh or rig that defines facial feature movement of the entity. The rig and/or mesh may be correlated with viseme units automatically to reproduce facial feature movement on any entity.

A viseme unit may comprise an animation that simulates lip movement of an animated entity. Individual ones of the viseme units may correspond to one or more of one or more complete phonemes; one or more partial phonemes that span a beginning, middle, and/or end of a given phoneme; one or more complete phonemes and phoneme context of the one or more complete phonemes; and/or other information. Phoneme context of a given complete phoneme may include a phoneme and/or partial phoneme that may be adjacent to the given complete phoneme.

Potential sets of viseme units that correspond with individual phoneme string portions may be determined. One of the potential sets of viseme units may be selected for individual ones of the phoneme string portions based on a fit metric that conveys a match between individual ones of the potential sets and the corresponding phoneme string portion. The selected viseme units may be combined to create a viseme string used for animating an entire phoneme string. In some implementation, combining viseme units may include interpolating frames between the boundary frames of the viseme units in order for the respective animations to flow together as one. In some implementations, combining viseme units may be referred to as "stitching."

The system may include one or more physical processors configured to execute machine-readable instructions to facilitate speech animation using visemes with phonetic boundary context. The machine-readable instructions may include one or more of a viseme manager component, an input component, a potential set component, a selection component, a presentation component, and/or other components.

The viseme manager component may be configured to access and/or manage a database of viseme units. The viseme units may comprise variable length, concatenative units for generating speech animation. That is, individual ones of the viseme units may represent a finite set of visible movements that may be made by an animated entity during speech animation. A set of viseme units may comprise one or more viseme units that may be combined to generate speech animation conveying movement of a jaw, lips, teeth, tongue, and/or other facial features of an animated entity.

The input component may be configured to obtain phoneme strings comprising a sequence of phonemes. The obtained phoneme strings may include a first phoneme string. The first phoneme string may include a first phoneme string portion. The first phoneme string portion may correspond to one or more discrete visual movements of a jaw, lips, teeth, tongue, and/or other facial features.

The potential set component may be configured to determine potential sets of viseme units that correspond with the first phoneme string portion. The determined potential sets may include one or more of a first potential set, a second potential set, and/or other potential sets.

The selection component may be configured to select one of the potential sets of viseme units based on a fit metric. The fit metric may convey a match between individual ones of the potential sets and the first phoneme string portion. The first metric may convey match through expressions in binary terms (e.g., a "match," or "no match"), continuous or value-range terms (e.g., a degree or extent of match, such as along a sliding scale), and/or other expressions. By way of non-limiting example, the first potential set may be selected over the second potential set based on a first fit associated with the first potential set conveying a better match with the first phoneme string portion than a second fit associated with the second potential set.

The presentation component may be configured to effectuate presentation of an animation of an animated entity (e.g., a computer generated character) on one or more computing platforms. The animation may include animated jaw, lips, teeth, tongue, and/or other facial feature movement for the animation entity defined by a viseme string. In some implementations, the presentation component may be configured to synchronize jaw, lips, teeth, tongue, and/or other facial feature movement of an animation entity with audio corresponding to a phoneme string.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise.

DETAILED DESCRIPTION

Figure 1:
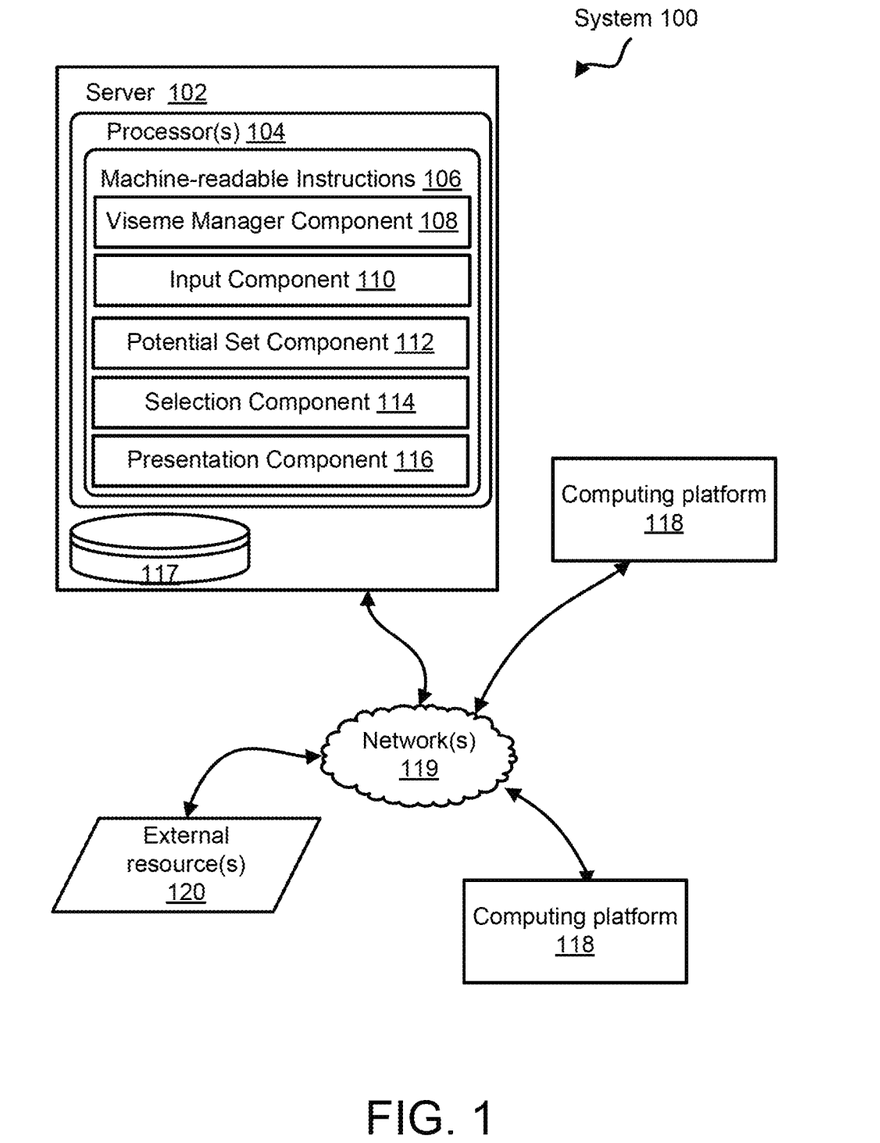
FIG. 1 illustrates a system configured for speech animation using visemes with phonetic boundary context, in accordance with one or more implementations.

FIG. 1 illustrates a system 100 configured for speech animation using visemes with phonetic boundary context, in accordance with one or more implementations. Visemes, or, more specifically, individual viseme units, may include concatenative units used for generating speech animation. A viseme unit may correspond to one or more of one or more complete phonemes; one or more partial phonemes that span a beginning, middle, and/or end of a given phoneme; one or more complete phonemes and phoneme context of the one or more complete phonemes; and/or other information. A viseme unit may describe one or more visual gestures (e.g., jaw, lips, teeth, tongue, and/or other facial feature movement of a facial model of an animation entity) that correspond to the one or more complete phonemes and/or phoneme context. An animation entity may comprise, for example, a computer generated (CG) character, and/or other entity.

In some implementations, a viseme unit may correspond to a set of machine-readable instructions that, when executed by one or more physical processors, define deformation of a jaw, lips, teeth, tongue, and/or other facial features of an animation entity over time. By way of non-limiting example, a viseme unit may correspond to an animation sequence (e.g., a sequence of frames) and/or a description of an animation sequence for animating a computer generated (CG) character and/or other animation entity. In some implementations, a viseme unit may be represented visually by a series of visual cues that describe an animation sequence.

A phoneme may correspond to a linguistic unit of speech and/or individual speech sounds a human speaker makes when pronouncing words. Herein, a sequence of phonemes may be referred to as a phoneme string. For illustrative purposes, a phoneme may be textually denoted by a corresponding speech sound written between slashes. By way of non-limiting example, in the word "kiss", the "s" sound may be textually denoted by the phoneme "/s/."

To facilitate speech animation, individual phonemes and/or phoneme string portions may be matched with corresponding viseme units. In some implementations, a phoneme and/or phoneme string portion may correspond to more than one viseme unit and/or sets of visemes units, and/or vice versa. By way of non-limiting example, words such as "pet," "bell,", and "men" may correspond to the same or substantially the same viseme unit and/or combination of viseme units due to a similarity in lip movement for individual ones of the words. By way of non-limiting example, the word "pet" may correspond to more than one viseme unit and/or sets of viseme units. A given viseme unit and/or set of viseme units may be selected over others based on a fit metric and/or other measured used to describe a match with the phoneme and/or phoneme string portion. Selected viseme units and/or sets may be stitched together to ultimately define speech animation for an entire phoneme string. Herein, a sequence of viseme units may be referred to as a viseme string.

Figure 3:
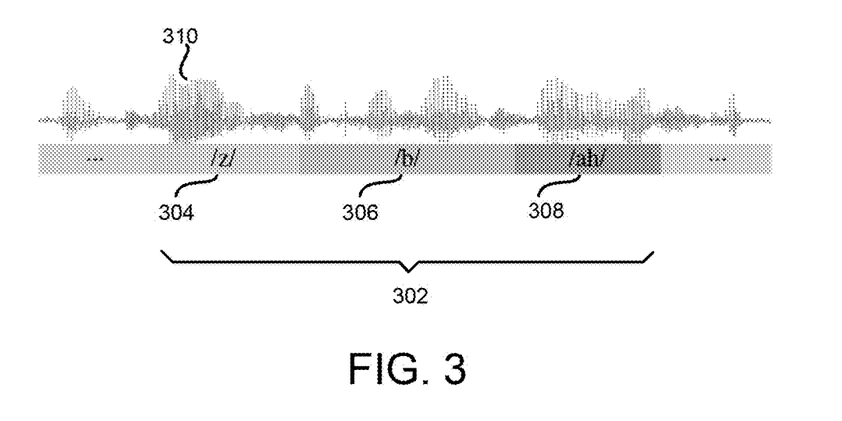
FIG. 3 illustrates an exemplary phoneme string portion of phoneme string.

By way of non-limiting illustration in FIG. 3, an exemplary phoneme string portion 302 is shown. The phoneme string portion 302 may sequentially include a first phoneme 304, a second phoneme 306, a third phoneme 308, and/or other phonemes. The sequence of the first phoneme 304, second phoneme 306, and third phoneme 308 may comprise a triphone. For illustrative purposes, the first phoneme 304 may be a phoneme /z/; the second phoneme 306 may be a phoneme /b/; and/or the third phoneme 308 may be a phoneme /ah/. For illustrative purposes, the phoneme string portion 302 is shown adjacent an audio waveform 310 that may represent a spoken utterance of the phoneme string portion 302 showing the cadence of speech sounds over time.

In spoken language, a phoneme may correspond to a particular lip and/or other facial feature shape and/or movement when uttered by a human speaker. When a given phoneme is spoken in the context of a sequence of phonemes (e.g., in a spoken word and/or sentence), the lip and/or other facial feature shape and/or movement for the given phoneme may vary depending on the phonemes preceding and/or following it. That is, the same phoneme in different phonetic contexts may appear very different visually. The phoneme's context describing a phoneme that may proceed or follow it may aid a selection process for mapping phoneme string portions to different sets of visemes, as presented in more detail herein.

By way of non-limiting example, consider a sequence of three arbitrary phonemes [/p1/, /p2/, /p3/] to be animated using one or more viseme units. In some implementations, a first viseme unit may correspond to a phoneme string [/p1/, /p2/]. A second viseme unit may correspond to the phoneme [/p3/]. A third viseme unit may correspond to a phoneme string [/p2/, /p3/]. The phoneme sequence may correspond to a first set of viseme units comprising the first viseme unit and the second viseme unit (e.g., [/p1/,/p2/],[/p3/]). The phoneme sequence may also correspond to a second set of viseme units comprising the first viseme unit and the third viseme unit (e.g., [/p1/,/p2/],[/p2/,/p3/]). The first set and second set may each form different viseme strings that may correspond to different animations of lip movement for animating speech of the phoneme string. Consideration of phoneme context of one or more of the phonemes in the phoneme string may provide a technique for selecting one of the first set or second set to animate the phoneme sequence. For example, if the context of phoneme /p1/ in the first viseme unit is that the animation of adjacent phoneme /p2/ spans the entire length of phoneme /p2/, selection of the first set of viseme units may provide a target choice to reproduce the sequence [/p1/, /p2/, /p3/]. This may be because the animation of phoneme /p2/ may be completed within the first viseme unit prior to the animation of subsequent phoneme /p3/ in the second viseme unit. If the context of phoneme /p3/ in the third viseme unit is that the animation of adjacent phoneme /p2/ also spans the entire length of phoneme /p2/ preceding phoneme /p3/, then the second set [/p1/,/p2/],[/p2/,/p3/] may result in lip movements for phoneme /p2/ incorrectly appearing twice in the animated output. On the other hand, if the context of phoneme /p1/ in the first viseme unit is that the animation of adjacent phoneme /p2/ spans the first half of phoneme /p2/ following phoneme /p1/, and the context of phoneme /p3/ in the third viseme unit is that the animation of adjacent phoneme /p2/ spans the second half of phoneme /p2/ preceding phoneme /p3/, then the second set [/p1/,/p2/],[/p2/,/p3/] may more accurately reproduce lip movement for the phoneme string, given that /p2/ is not repeated but instead spans between the boundaries of the viseme units.

Viseme units may correspond to one or more complete phonemes and phoneme context of the one or more complete phonemes. Phoneme context may be provided as contextual "labels" and/or "tags" associated with the viseme units. Herein, the terms "label" and/or "tag" may be used interchangeably to generally mean information associated with a viseme unit. By way of non-limiting example, a label, tag, and/or other information may be included as metadata associated with individual viseme units.

In some implementations, phoneme context labels and/or tags may convey that a viseme unit includes a partial phoneme. If the partial phoneme is adjacent to a complete phoneme, the context label may thereby provide context to that complete phoneme. A context label and/or tag may convey whether a given partial phoneme spans one or more of a beginning of a phoneme (e.g., indicated by a "+", and/or other label), a middle of a phoneme (e.g., indicated by an "*" and/or other label), and/or an end of a phoneme (e.g., indicated by a "−" and/or other label).

The contextual labels may be used to guide a phoneme-to-viseme unit lookup and/or selection. For example, a viseme unit and/or set of viseme units may be selected based on matches with a given phoneme and/or phoneme string portion. The labels may aid in preventing cases where a set of viseme units may selected where phonemes and/or partial phonemes may be erroneously repeated or skipped in a final animation output sequence. For example, if a contextual label indicates that a beginning part of a phoneme appears adjacent to a complete phoneme and at the end of a given viseme unit, a next viseme unit in a set should start with the middle or end part of that partial phoneme to provide a visually smooth transition between viseme units. By way of non-limiting example, if a complete phoneme starts and/or ends a given viseme unit, the next selected viseme unit should start from a following complete phoneme in the string. For example, a first viseme unit may be labeled as [/p1/, /p2+/] and/or a second viseme unit may be labeled as [/p2−/, /p3/]. The set comprising the two units may be labeled as [/p1/, /p2+/], [/p2−/, /p3/], which means an animation of phoneme p2 occurs across a boundary between the end of the first viseme unit and the beginning of the second viseme unit. The provision of context labels may result in a reduction in erroneous selection of viseme units representing a duplication of a phoneme in an animated sequence (e.g., like a selection of [/p1/, /p2/], [/p2/, /p3/] representing a duplication of /p2/). This may also result in selection of viseme units that produce animations which more naturally resemble human speech (e.g., as compared to a set comprising [/p1/, /p2/], [/p3/] where an animated transition from phoneme /p2/ to /p3/ may be abrupt or less smooth looking). In some implementations, a visual smoothness may be associated with artifacts present in an animation, continuity in feature movement, and/or other visual aspects of animation.

In FIG. 1, the system 100 may include a host server 102 and/or other components. The host server 102 may include one or more physical processors 104 configured to execute machine-readable instructions 106. Executing the machine-readable instructions 106 may cause the one or more physical processors 104 to facilitate speech animation using viseme units with phonetic boundary context. The machine-readable instructions 106 may include one or more of a viseme manager component 108, an input component 110, a potential set component 112, a selection component 114, a presentation component 116, and/or other components. Users may access server 102 via computing platforms 118 over one or more networks 119. The network(s) 119 may include the Internet, a local area network, and/or other networks. For example, users may access information stored and/or determined by server 102 via computing platforms 118 based on client/server architecture.

In some implementations, one or more features and/or functions of server 102 may be attributed to individual ones of the computing platforms 118. By way of non-limiting example, speech animation may be facilitated by information stored by and/or determined at the computing platforms 118 with or without access to server 102. In some implementations, speech animation may be facilitated by information processing at both of a computing platform 118 and server 102. By way of non-limiting example, computing platforms 118 may access a database of viseme units stored at server 102 and may execute processes locally to generate a speech animation based on viseme units obtained from server 102. Information processing may be carried out in other ways.

The viseme manager component 108 may be configured to access and/or manage a database of viseme units. The viseme units may comprise variable length, concatenative units for generating speech animation. Individual ones of the viseme units may represent a finite set of visible movements that may be made during speech animation. A set of viseme units may comprise one or more viseme units that may be stitched together to generate speech animation conveying simulated movement of a jaw, lips, teeth, tongue, and/or other facial features of an animated entity. In some implementations, viseme units may correspond to phonemes on a many-to-many basis. In some implementations, phoneme and/or viseme unit boundaries may not align, such that complete phonemes may not be fully contained within a single viseme unit. The partial spanning of the phonemes may be addressed in context labels associated with the viseme units.

Viseme units may be generated by a variety of techniques. In some implementations, viseme units may be generated by manually animating a computer generated (CG) character. By way of non-limiting example, an artist may have the freedom to tailor individual ones of the viseme units to fit different speaking styles and/or phoneme strings. In some implementations, viseme units may be automatically generated using mesh deformation transfer and/or other techniques. By way of non-limiting example, vertices on a source mesh (e.g., a virtual mesh laid over a recorded actor) may be correlated to vertices on the target mesh (e.g., a virtual mesh laid over a computer generated character). Points and/or shapes in a source mesh may correspond to points and/or shapes on the target mesh. Target meshes may be generated for each frame in a viseme unit by solving a linear system to create deformations of the target mesh that approximate the deformations in the source mesh. In some implementations, when only mouth or other specific feature movement of an animation entity is desired, additional constraints may be added such that only points on a target mesh associated with the movement may follow the identity transformation. Viseme units may be generated in other ways.

Complete phonemes, partial phonemes, and/or phoneme context of complete phonemes may be provided as labels, tags, and/or other information associated with individual ones of the viseme units. Phoneme context of a complete phoneme may include a partial phoneme that is adjacent to the complete phoneme. A partial phoneme may span, for example, a beginning of a phoneme, a middle of a phoneme, and/or an end of a phoneme. In implementations where a viseme unit starts and/or ends at a respective start and/or end of a complete phoneme, phoneme context of a complete phoneme may include an adjacent complete phoneme (e.g., indicating that the adjacent phoneme is also a complete phoneme).

Context labels may facilitate mapping input phoneme strings to sets of viseme units. By way of non-limiting example, if a contextual label indicates that a beginning part of a phoneme appears adjacent a complete phoneme at an end of viseme unit, a next viseme unit may be selected that contains a middle or end of the same phoneme at the beginning of the next viseme unit. If an entire phoneme appears at the end of a first viseme unit, a second viseme unit may be selected that includes the following phoneme in the phoneme string at the beginning of the second viseme unit.

In some implementations, the viseme manager component 108 may be configured to group viseme units and/or sets of viseme units together based on similarity. In some implementations, similarity may correspond to visual similarity of a corresponding animation, context label similarity, and/or other similarities.

In some implementations the viseme manager component 108 may be configured to determine a grouping score for individual viseme units and/or sets of viseme units. By way of non-limiting example, a grouping score may be determined based on visual aspects of a corresponding animation, context labels, and/or other information. A grouping score may be used to group viseme units and/or sets together based on a comparison of grouping scores. For example, if two or more viseme units and/or sets have grouping scores that are an exact match and/or within a threshold range, the two or more viseme units and/or sets may be grouped together. In some implementations, pairwise similarity may be determined directly between pairs of viseme units and/or sets.

In some implementations, a grouping score may be numerical (e.g., point, amount, score, rank, ratings, grades, degree, or any other type of numerical value), descriptive (e.g., "mouth slightly open, tongue positioned forward," "mouth closed," "mouth wide open, teeth exposed," and/or other description), and/or any other representation of a grouping score used to determine similarity between viseme units and/or sets of viseme units.

In some implementations, a grouping score may include the one or more complete phonemes, partial phonemes, and/or phoneme context stored in the metadata associated with the viseme units. The viseme units and/or sets may be grouped based on the same or some threshold similarity between complete phonemes, partial phonemes, and/or phoneme context associated with the viseme units and/or sets.

In some implementations, the viseme manager component 108 may be configured to group viseme units and/or sets of viseme units using clustering software. By way of non-limiting example, the viseme manager component 108 may use the freely available CLUTO clustering package and/or other techniques.

Figure 4:
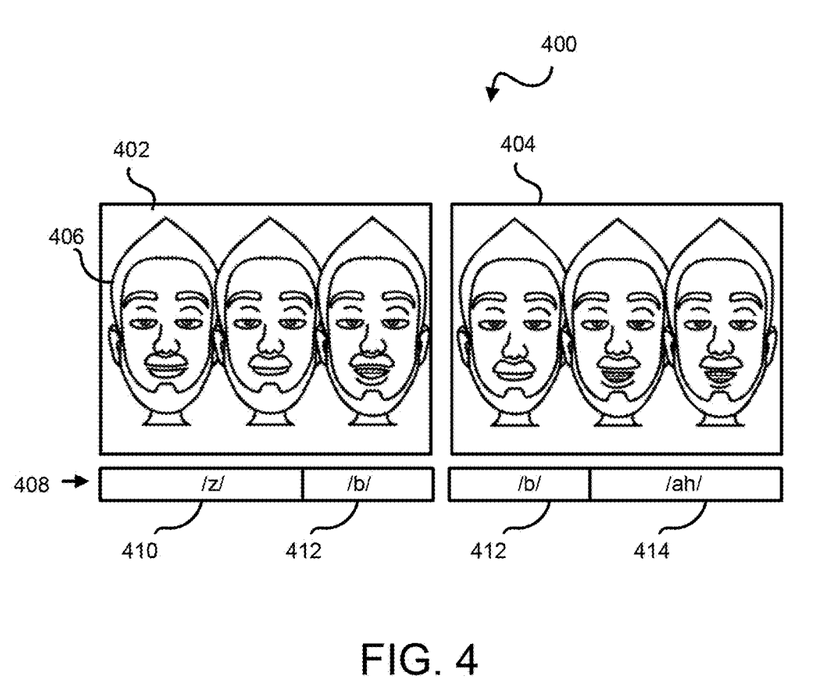
FIG. 4 illustrates an exemplary implementation of a set of viseme units.

By way of non-limiting illustration in FIG. 4, an exemplary representation of a first set 400 of viseme units is shown. The first set 400 may include a first viseme unit 402, a second viseme unit 404, and/or other viseme units. Also illustrated are exemplary labels 408 that may be associated with the viseme units. The labels 408 may describe one or more of one or more complete phonemes, one or more partial phonemes, and/or phoneme context for one or more complete phonemes associated with the viseme units.

The first viseme unit 402 may describe changes in visual movement of one or more of a jaw, lips, teeth, tongue, and/or other facial features of an animated entity 406 over time. The first viseme unit 402 may include an animation sequence and/or a description of an animation sequence for the animated entity 406. The changes in visual movement may be in accordance with a first complete phoneme 410, phoneme context of the first complete phoneme 410, a second complete phoneme 412, and phoneme context of the second complete phoneme 412. By virtue of the first viseme unit 402 ending at the end of the second complete phoneme 412, the phoneme context of the first complete phoneme 410 may include the second complete phoneme 412. By virtue of the first viseme unit 402 starting at the beginning of the first complete phoneme 410, the phoneme context for the second complete phoneme 412 may include the first complete phoneme 410.

The second viseme unit 404 may describe changes in visual movement of one or more of a jaw, lips, teeth, tongue, and/or other facial features of the animated entity 406 over time. The second viseme unit 404 may include an animation sequence and/or a description of an animation sequence for an animated entity 406. The visual changes may be in accordance with the second complete phoneme 412, phoneme context of the second complete phoneme 412, a third complete phoneme 414, and phoneme context for the third complete phoneme 414. By virtue of the second viseme unit 404 ending at the end of the third complete phoneme 414, the phoneme context of the second complete phoneme 412 may include the third complete phoneme 414. By virtue of the second viseme unit 404 starting at the beginning of the second complete phoneme 412, the phoneme context of the third complete phoneme 414 may include the second complete phoneme 412.

For illustrative purposes, the first complete phoneme 410 may correspond to the first phoneme 304 from the phoneme string portion 302 in FIG. 3, the second complete phoneme 412 may correspond to the second phoneme 306 from the phoneme string portion 302 in FIG. 3, and the third complete phoneme 414 may correspond to the third phoneme 308 from the phoneme string portion 302 in FIG. 3.

Figure 5:
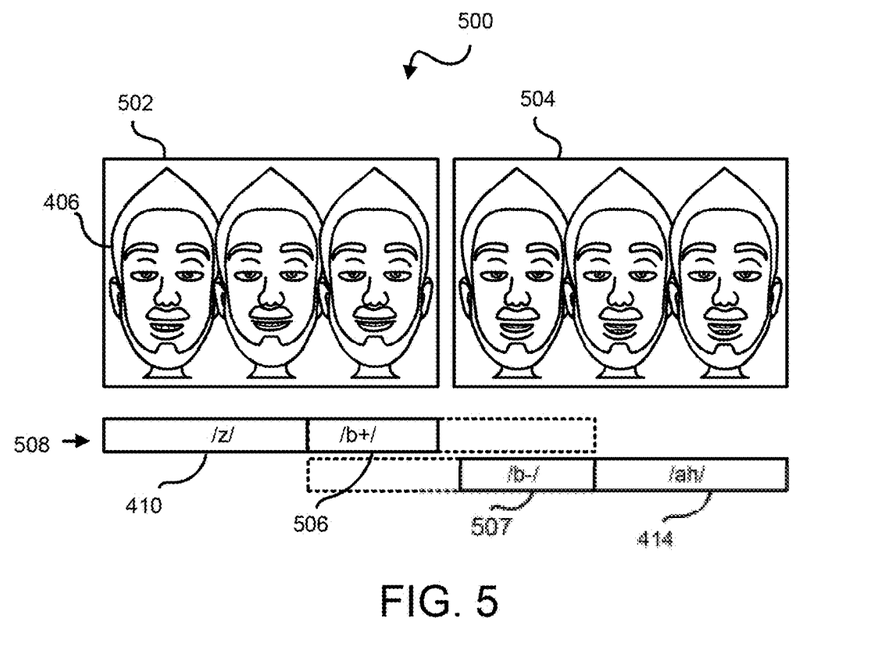
FIG. 5 illustrates another exemplary implementation of a set of viseme units.

FIG. 5 illustrates an exemplary representation of a second set 500 of viseme units. The second set 500 may include a third viseme unit 502, a fourth viseme unit 504, and/or other viseme units. Also illustrated are exemplary labels 508 that may be associated with the viseme units. The labels 508 may describe one or more complete phonemes and/or phoneme context for the complete phonemes associated with the viseme units. The phoneme context may include a partial phoneme adjacent to a complete phoneme.

The third viseme unit 502 may describe changes in visual movement of one or more of a jaw, lips, teeth, tongue, and/or other facial features of the animated entity 406 over time. The third viseme unit 502 may include an animation sequence and/or a description of an animation sequence for the animated entity 406. The visual changes may be in accordance with the first complete phoneme 410 and first phoneme context 506 of the first complete phoneme 410.

The first phoneme context 506 of the first complete phoneme 410 may include a phoneme that is adjacent to the first complete phoneme 410 at the end of the third viseme unit 502. The first phoneme context 506 may comprise a partial phoneme that spans a beginning of the phoneme (e.g., a first half). For illustrative purposes, the first phoneme context 506 may correspond to a beginning (e.g., first half) of the second phoneme 306 from the phoneme string portion 302 in FIG. 3 (e.g., labeled as /b+/ in FIG. 5).

The fourth viseme unit 504 may describe changes in visual movement of one or more of a jaw, lips, teeth, tongue, and/or other facial features of the animated entity 406 over time. The fourth viseme unit 504 may include an animation sequence and/or a description of an animation sequence for the animated entity 406. The visual changes may be in accordance with the third complete phoneme 414 and second phoneme context 507 of the third complete phoneme 414. The second phoneme context 507 of the third complete phoneme 414 may include a phoneme that is adjacent to the third complete phoneme 414 at the start of the fourth viseme unit 504. The second phoneme context 507 may comprise a partial phoneme that spans an end of a phoneme (e.g., a second half). For illustrative purposes, the second phoneme context 507 may correspond to an end (e.g., second half) of the second phoneme 306 of the phoneme string portion 302 in FIG. 3 (e.g., labeled as /b−/ in FIG. 5).

Figure 2:
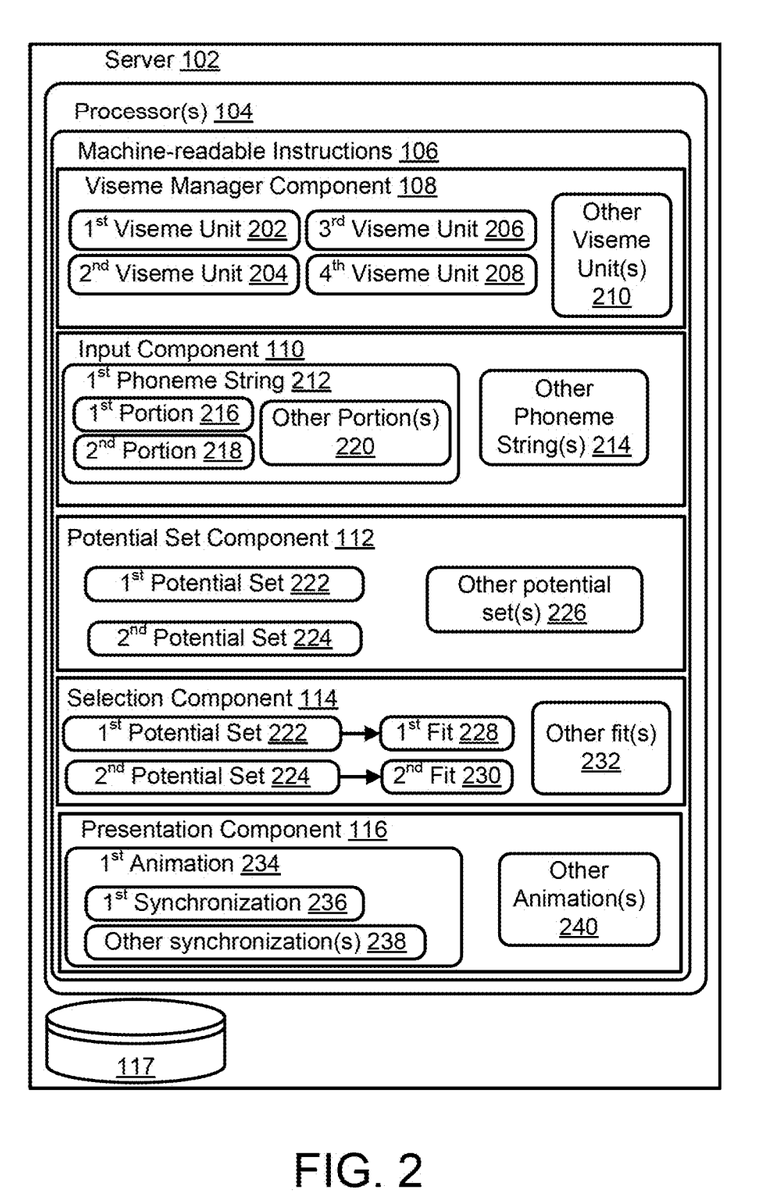
FIG. 2 illustrates an exemplary implementation of a server of the system of FIG. 1.

By way of non-limiting illustration in FIG. 2, the viseme manager component 108 may be configured to access and/or manage a first viseme unit 202, a second viseme unit 204, a third viseme unit 206, a fourth viseme unit 208, and/or other viseme units. The viseme units may be associated with context labels and/or tags. By way of non-limiting example, the first viseme unit 202 may be associated with a first label (not shown in FIG. 2). The first label may describe one or more complete phonemes and/or phoneme context for the complete phonemes associated with the first viseme unit 202.

Returning to FIG. 1, the input component 110 may be configured to obtain phoneme strings for speech animation. In some implementations, phoneme strings may be obtained from one or more of audio, text, and/or other input. In some implementations, an input source may comprise a user, a text document, and/or other sources. By way of non-limiting example, a user may provide audio input into a microphone. The audio input may be recorded. The audio input may be made accessible by the input component 110. The audio input may be communicated to the input component 110 in real time or near real time as the user speaks in to the microphone. The input component 110 may be configured to determine a phoneme string from the audio input using speech-to-phoneme mapping techniques and/or other techniques.

In some implementations, a user may input text into a text input field presented on a user interface (not shown in FIG. 1). In some implementations, the input component 110 may be configured to extract text from one or more text sources automatically. By way of non-limiting example, the input component 110 may be configured to extract text from a document using optical character recognition (OCR) and/or other techniques. The input component 110 may be configured to determine a phoneme string from text input based on a mapping between textually represented words and/or sentences and phonetic representations of the words and/or sentences.

The input component 110 may be configured to segment the phoneme string into non-overlapping phoneme string portions that correspond to discrete visual movements of a jaw, lips, teeth, tongue, and/or other facial features. The segmentation may be based on determining portions of the phoneme string where one or more visual aspects of jaw, lips, teeth, tongue, and/or other facial feature movements may change. By way of non-limiting example, a change may correspond to one or more of a lip closure during a bilabial closure, a peak of a lip opening during a vowel, a contact of a lower lip with one or more upper teeth during a labiodental fricative, and/or other visual changes. In some implementations, the input component 110 may be configured to make such determination based on machine-learning or probabilistic modeling techniques, such as hidden Markov models (HMMs) and/or hidden semi-Markov models (HSMMs). By way of non-limiting example, input component 110 may be configured such that machine-learning techniques may be based on a set of training data where input phoneme strings are broken up into segments of known discrete visual movement (e.g., based on human input).

By way of non-limiting illustration in FIG. 2, the input component 110 may be configured to obtain a first phoneme string 212 and/or other phoneme strings 214. The first phoneme string 212 may include a first phoneme string portion 216, a second phoneme string portion 218, and/or other phoneme string portions 220.

Returning to FIG. 1, the potential set component 112 may be configured to determine potential sets of viseme units that correspond to individual ones of the phoneme string portions. The potential sets may be determined based on viseme units and/or sets of viseme units that may be grouped together by the viseme manager component 108. In some implementations, the potential set component 112 may be configured to associate a phoneme string portion with one or more groups of viseme units and/or sets of viseme units. As described herein, a group may comprise one or more viseme units and/or sets of viseme units that may be similar based on one or more of visual similarity, context label similarity, and/or other types of similarity.

In some implementations, the potential set component 112 may be configured to employ a hash table and/or other information to determine potential sets. A hash table may associate keys with buckets. The keys may include phonemes and/or phoneme sequences. The buckets may include a list of viseme units and/or sets of viseme units that may match and/or substantially match a phoneme and/or phoneme sequence (e.g., based on context labels of the viseme units and/or other information). This may provide a lookup of viseme units and/or sets of viseme units that may correspond to a particular string of phonemes. In some implementations, a phoneme string portion may be used as a search term. One or more viseme units and/or sets of viseme units that correspond to that phoneme string portion may be returned. Individual ones of the potential sets of viseme units that correspond to a phoneme string portion may form different viseme strings that may form different animations of lip movement. Potential viseme units and/or sets of viseme units may be determined in other ways.

By way of non-limiting illustration in FIG. 2, the potential set component 112 may be configured to determine a first potential set 222, a second potential set 224, and/or other potential sets 226 that correspond to the first phoneme string portion 216. The first potential set 222 may comprise the first viseme unit 202, the second viseme unit 204, and/or other viseme units 210. The second potential set 224 may comprise the third viseme unit 206, the fourth viseme unit 208, and/or other viseme units 210. The potential set component 112 may be configured to determine potential sets of viseme units that correspond to the second phoneme string portion 218 and/or other phoneme string portions 220 of the first phoneme string 212.

Returning to FIG. 1, the selection component 114 may be configured to determine a match between individual ones of the potential sets of viseme units and a corresponding phoneme string portion. The selection component 114 may be configured to select one of the potential sets of viseme units that correspond to a given phoneme string portion based on the match between individual ones of the potential sets and the corresponding phoneme string portion.

In some implementations, the selection component 114 may be configured to determine a match between individual potential sets and a corresponding phoneme string portion based on one or more fit metrics. In some implementations, a fit metric may convey matches between potential sets and phoneme string portions based one or more of an animation cost for using a given potential set, a smoothness or "natural" look of an animation using a given potential set, and/or other metrics.

In some implementations, animation cost may be associated with how much an individual viseme unit may have to be visually changed in order for transitions between viseme unit boundaries to appear as a smooth and continuous animation. Animation cost may correspond to one or more operations that may be employed to "stitch" together (e.g., combine) viseme units of a potential set to make a corresponding animation sequence of the viseme units. By way of non-limiting example, stitching together individual ones of the viseme units of a potential set may require one or more of retiming, positional realignment, blending at the boundary frames of the viseme units, and/or other processes in order to produce a smooth, continuous animation sequence of two or more viseme units. In some implementations, blending may require approximating frames by interpolating between an ending frame of a starting viseme unit and a starting frame of a subsequent viseme unit and/or other operations.

In some implementations, animation costs may increase depending on an amount and/or degree of retiming, realignment, blending, and/or other "stitching" operations that may need to take place. In some implementations, a cost to stitch together any two viseme units may be based on one or more cost-associated aspects of the viseme units. Cost-associated aspects may include one or more of a visual aspect of a starting frame of the viseme unit, a visual aspect of an ending frame of the viseme unit, a frame rate of the viseme unit, and/or other aspects. For example, a first viseme unit may include a first cost-associated aspect. A second viseme unit may include a second cost-associated aspect. A cost for stitching together the first viseme unit and second viseme unit may be determined based on the first cost-associated aspect, the second cost-associated aspect, and/or other cost associated aspects.

By way of non-limiting example, cost to stitch together two viseme units may be based on the amount of visual dissimilarity (or similarity) between the ending frame of a first viseme unit and starting frame of a subsequent viseme unit and/or other information. The cost may be greater for two viseme units that end and start, respectively, with substantial visual dissimilarity than for two viseme units that end and start, respectively, with little or no visual dissimilarity. A higher animation cost being associated with visually dissimilar viseme units may be due to an amount of frame interpolation that may be required to "connect" the boundaries of the viseme units to produce a continuous, smooth animation. By way of non-limiting example, if an ending frame of a viseme unit includes an open mouth and a starting frame of a next viseme unit includes a closed mouth, an animation cost to stitch together the two viseme units may be a first cost. The first cost may be greater than a cost to stitch together a viseme unit that ends with a closed mouth and another viseme unit that starts with a closed mouth. The above example of difference in animation costs based on mouth positions associated with the boundaries of viseme units is provided for illustrative purposes only and is not to be considered limiting. By way of non-limiting example, other types of visual similarity (or dissimilarity) may affect an animation cost.

In some implementations, animation cost to stitch together two or more viseme units may be based on a difference in frame rate between the viseme units and/or information. By way of non-limiting example, an animation cost may be greater for two viseme units that have frame rates that differ above a threshold than for two viseme units whose difference in frame rate falls below the threshold and/or do not differ. The cost may be due to the amount of retiming of viseme units required to produce a continuous, smooth animation. By way of non-limiting example, if a viseme unit is based on a first frame rate and a next viseme unit is based on a second frame rate, cost to stitch together the two viseme units may be a first cost. The first cost may be greater when the difference between the first frame rate and second frame rate grows.

In some implementations, an amount of visual dissimilarity (or similarity) between ending and starting frames of two viseme units may correspond to a smoothness or "natural" look of the stitched-together viseme units. For example, frames that may be approximated via interpolation between the boundaries of the viseme units may be less "natural" looking than the frames within the animation of the viseme units themselves (e.g., by virtue of the frames within a viseme unit being generated for specific phonemes and phoneme context while an interpolated frame may be an approximation). The smoothness and/or natural look of the interpolated frames may degrade as the visual dissimilarity between the boundary frames increases.

In some implementations, visual dissimilarity (or similarity) between ending and starting frames of two viseme units may be determined based on the context labels associated with viseme units and/or other information. By way of non-limiting example, a first viseme unit may include a context label that conveys that the first viseme unit ends at an end of a first phoneme. By way of non-limiting illustration in FIG. 4, a label 408 for the first viseme unit 402 may convey that a boundary frame at the end of first viseme unit 402 corresponds to an ending lip position of the second complete phoneme 412. A label 408 for the second viseme unit 404 may convey that a boundary frame at the start of the second viseme unit 404 corresponds to a starting lip position the second complete phoneme 412. The selection component 114 may be configured to determine that the ending lip position and starting lip position may be visually dissimilar (e.g., and/or dissimilar up to some threshold amount). An animation cost to stitch together the first viseme unit 402 and second viseme unit 404 may include a first cost. The first cost may be greater than a cost associated with an ending frame and starting frame that are relatively more visually similar.

In some implementations, the selection component 114 may be configured to convey matches and/or fit metrics numerically, descriptively, progressively, pictorially, and/or using other representations of a match and/or fit metric conveying a match between individual sets of viseme units and a corresponding phoneme string portion. By way of non-limiting illustration, a numerical fit metric may be expressed as one or more of a point, amount, score, rank, ratings, grades, degree, or any other type of numerical value. A descriptive fit metric may be expressed as one or more of good, bad, close, way off, and/or other description. A progressive fit metric may be expressed as better, best, worse, worst, and/or any other progressive description. A pictorial fit metric may be expressed as an image of thumbs up, thumbs down, and/or other imagery.

By way of non-limiting example, a numerical fit may be based on a scale from 0 to 100 (and/or other values). In some implementations, for a fit metric associated with animation cost, a "0" may represent a lowest animation cost to use a potential set. In some implementations, for a fit metric associated with an animation cost, a "100" may represent a highest animation cost to use a potential set. Values between 0 and 100 may represent varying degrees of the match. In some implementations, a highest animation cost may correspond to a relatively most amount of changes being made for individual viseme units to stitch them together into a set. In some implementations, a lowest animation cost may correspond to a least amount of changes being made for individual viseme units to stitch them together into a set.

In some implementations, for a fit metric associated with a visual smoothness, a "0" may represent a least amount of smoothness, and/or other representations of a bad match. For a fit metric associated with a visual smoothness, a "100" may represent a most amount of smoothness (e.g., the most natural looking transitions between units), and/or other representations of a good match. In some implementations, a least amount of smoothness may correspond to artifacts, "fuzziness," and/or other aesthetically displeasing aspects being present between boundary frames. In some implementations, the most amount of smoothness may correspond to the most natural looking transitions between viseme units. Values between 0 and 100 may represent varying degrees of the match.

By way of non-limiting example, referring to FIG. 5, the selection component 114 may be configured to determine that an ending frame of the third viseme unit 502 corresponds to an ending lip position of a first part of second complete phoneme 412 (e.g., based on the first phoneme context 506). The selection component 114 may be configured to determine that a starting frame of the fourth viseme unit 504 may correspond to a starting lip position of a second part of the second complete phoneme 412 that immediately follows the first part (e.g., based on the second phoneme context 507). The selection component 114 may be configured to determine that the boundary frames of third viseme unit 502 and fourth viseme unit 504 correspond to visually similar lip positions. A cost to stitch together the third viseme unit 502 and fourth viseme unit 504 may be substantially less than that of the first set 400 in FIG. 4.

Returning to FIG. 1, in some implementations, the selection component 114 may be configured to select one of the potential sets of viseme units that correspond to a given phoneme string portion based on the match between individual ones of the potential sets and the corresponding phoneme string portion. A given potential set may be selected over other potential sets based on a fit conveying a better match of the given potential set with the phoneme string than fits for the other potential sets. By way of non-limiting example, if a fit conveys that an animation cost may be lower for a given potential set than a cost for the other potential sets, the given potential set may be selected. By way of non-limiting example, if a fit conveys that a smoothness that is more natural for a given potential set than for other potential sets, the given potential set may be selected. Potential sets may be selected in other ways.

Figure 6:
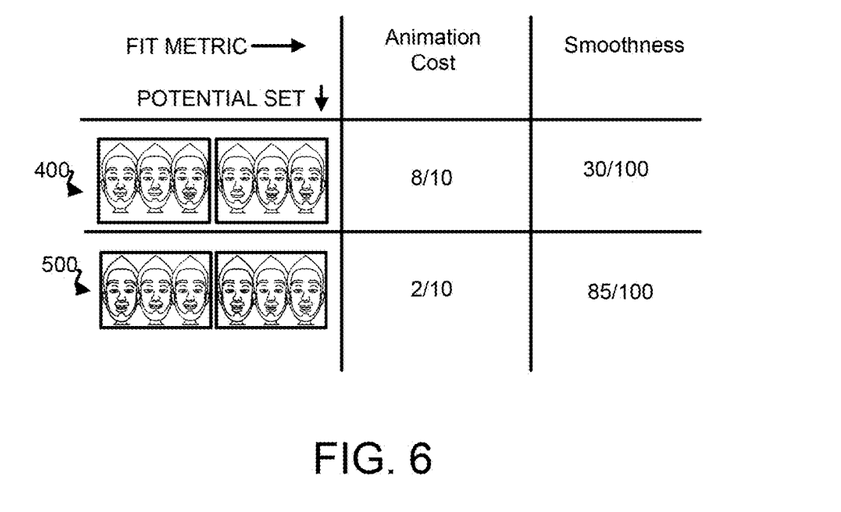
FIG. 6 illustrates a visual representation of a fit metric used to select one of a plurality of potential sets of viseme units that correspond to a given phoneme sequence, in accordance with one or more implementations.

By way of non-limiting illustration in FIG. 6, an exemplary visual representation of fit metrics associated with the first set 400 and second set 500 is shown. In some implementations, a fit metric may be based on one or more of an animation cost, smoothness, and/or other metrics. The values of the fit metrics for the first set 400 and second set 500 are shown as numerical values. However, fit metrics may be expressed in other ways. By way of non-limiting example, the animation cost type fit of the first set 400 may be given a value of "8/10," (and/or other value). This may correspond to a bad fit and/or high animation cost. The animation cost for the fit of the second set 500 may be given a value of "2/10," (and/or other value). This may correspond to a good fit and/or moderately low animation cost. The smoothness of the fit for the first set 400 may be given a value of "30/100," (and/or other value). This may correspond to a low fit and/or low visual smoothness. The smoothness of the fit for the second set 500 may be given a value of "85/100," (and/or other value). This may correspond to a moderately good fit and/or moderately high smoothness. The selection component 114 may be configured to select one of the potential sets based on one or more of the fit metrics. For example, the second set 500 may be selected based at least on these two fit metrics conveying a better match with a first phoneme string portion than the first set 400.

It is noted that the depiction in FIG. 6 and accompanying description are provided for illustrative purposes only. As such, it is not to be considered limiting with respect to fit metrics, how fit values are represented, and/or the selection of a potential set of viseme units based on one or more fit metrics. By way of non-limiting example, in some implementations, the selection of a potential set from a plurality of potential sets may be based on more or fewer fit metrics and/or based on other information.

In some implementations, once a potential set of viseme units has been selected for a given phoneme string portion, the selection component 114 may be configured to select one of the potential sets of viseme units that correspond to the next phoneme string portion of a given phoneme string. In some implementations, the selection component 114 may be configured to determine individual fits between individual ones of the potential sets of viseme units that correspond to the next phoneme string portion. The selection component 114 may be configured to select one of the potential sets of viseme units that correspond to the phoneme string portion based on one or more fit metrics.

In some implementations, the selection component 114 may be configured to determine a fit between a currently selected potential set and a previously selected potential set. By way of non-limiting example, fit between potential sets may be determined the same way or similarly to the determination of fit between individual viseme units of a potential set, as presented herein. By way of non-limiting example, the selection component 114 may be configured to determine fit between potential sets based on cost-associated aspects related to the ending frame of a previously selected potential set and a starting frame of a currently selected potential set. In some implementations, if a fit between a prior potential set and current potential set conveys a bad match (e.g., high cost to stitch together and/or unsmooth animation of the interpolated frames), one or both of the prior selected potential set and/or currently selected potential set may be removed, and/or the selection of potential sets may be performed again for the prior phoneme string portion and/or the current phoneme string portion. In some implementations, given sufficient processing power, the processes of determining fits between selected potential sets may be performed continuously along the length of the entire phoneme string. A final viseme unit may be generated that conveys the best match of viseme units and/or set along the entire length of the corresponding phoneme string.

By way of non-limiting illustration in FIG. 2, the selection component 114 may be configured to determine a first fit 228 between the first potential set 222 and the first phoneme string portion 216, a second fit 230 between the second potential set 224 and the first phoneme string portion 216, and/or other fits 232 between other potential sets and/or other phoneme string portions 220. In some implementations, the selection component 114 may be configured such that the first potential set 222 may be selected over the second potential set 224 based on the first fit 228 conveying a better match with the first phoneme string portion 216 than the second fit 230. In some implementations, the selection component 114 may be configured to select a potential set of viseme units that correspond to the second phoneme string portion 218. The selection component 114 may be configured to determine a fit between the selected potential set of the second phoneme string portion with the prior selected first potential set 222. The selection component 114 may be configured to confirm the selection of the potential set for the second phoneme string portion 218 based on this fit. If this fit conveys a bad match, one or both of the selected first potential set 222 or selected potential set for the second phoneme string portion 218 may be removed and/or the selection processes repeated.

Returning to FIG. 1, the presentation component 116 may be configured to effectuate presentation of an animation of an animated entity on one or more computing platforms 118. The animation may include animated jaw, lips, teeth, tongue, and/or other facial feature movement for the animation entity defined by a viseme string. The viseme string may be in accordance with a "stitching" together of the selected ones of the potential sets that corresponds to individual ones of phoneme string portions of a phoneme string. In some implementations, the presentation component 116 may be configured to stitch together the selected potential sets in real time, or near real time, as the animation is presented. In some implementations, the presentation component 116 may be configured to perform the stitching prior to presentation of the animation.

In some implementations, the presentation component 116 may be configured to synchronize jaw, lips, teeth, tongue, and/or other facial feature movement of an animation entity with audio corresponding to a phoneme string. This may be accomplished via one or more lip-synching techniques and/or other techniques. In some implementations, the audio may comprise an audio recording of user speech. In some implementations, the audio may comprise a machine-generated speech based on an input phoneme string (e.g., using text to speech techniques, and/or other techniques).

By way of non-limiting illustration in FIG. 2, the presentation component 116 may be configured to effectuate presentation of a first animation 234, and/or other animations 240. The first animation 234 may include a first animation entity and/or other entities. The first animation 234 may include animated jaw, lips, teeth, tongue, and/or other facial feature movement of the first animation entity defined at least in part by a selected one of the first potential set 222 or the second potential set 224, a selected potential set for the second phoneme string portion 218, and/or other selected potential sets for other phoneme string portions 220. The presentation component 116 may be configured to synchronize 236 jaw, lips, teeth, tongue, and/or other facial feature movement of the first animation entity with audio corresponding to the first phoneme string portion 216 in accordance with presentation of the first animation 234. The presentation component 116 may be configured to perform other synchronization 238 of other audio of other phoneme string portions 220 of the first phoneme string 212 during presentation of the first animation 234.

By way of non-limiting illustration, consider the sentence "A helpful leaflet may be enclosed in the letter." The input component 110 may be configured to determine a phoneme string from the sentence (e.g., based on either audio input and/or text input of the sentence). The input component 110 may be configured to segment the phoneme string into non-overlapping phoneme string portions that correspond to discrete visual movements of jaw, lips, teeth, tongue, and/or other facial features. The potential set component 112 may be configured to determine potential sets of viseme units that correspond to individual ones of the segmented phoneme string portions. The potential set component 112 may be configured to select one of the potential sets for individual ones of the phoneme string portions based on a determined fit. A final viseme string may be generated based on selections of the potential sets for individual ones of the phoneme string portions. By way of non-limiting illustration, considering the following viseme string that corresponds to the above reference sentence, illustrated by context labels of corresponding viseme units. Individual sets of visemes may be separated by brackets, while individual viseme unit within asset may be separated by slashes: "[/ae+/], [/ae−/, /hh/, /ah/, /l/, /p+/], [/p−/, /f/, /uh+/], [/uh−/, /l/, /iy−l/], [/iy−/, /f+/], [/f−/, /l/, /eh+/], [/eh−/, /t/, /m+/, /m−/], [/ey+/], [/ey−/, /b+/], [/b−/, /iy+/], [/iy−/, /n+/], [/n−/, /k/, /l/, /ow+/], [/ow−/, /z+/], [/z−/, /d/, /uh/, /n+/], [/n−/, /dh/, /ah/, /l+/], [/l−/, /eh/, /t/, /er+/], [/er−/]." Note that adjacent viseme units as well as adjacent sets may include complementary phoneme context (e.g., a "+" sign followed by a "−" sign.)

Returning to FIG. 1, server 102, computing platforms 118, and/or external resources 120 may be operatively linked via one or more electronic communication links. For example, such electronic communication links may be established, at least in part, via a network (e.g., network(s) 119) such as the Internet and/or other networks. It will be appreciated that this is not intended to be limiting, and that the scope of this disclosure includes implementations in which server 102, computing platforms 118, and/or external resources 120 may be operatively linked via some other communication media.

The external resources 120 may include sources of information that are outside of system 100, external entities participating with system 100, and/or other resources. In some implementations, some or all of the functionality attributed herein to external resources 120 may be provided by resources included in system 100.

Server 102 may include electronic storage 117, one or more processors 104, and/or other components. Server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 117 may comprise electronic storage media that electronically stores information. The electronic storage media of the electronic storage 117 may include one or both of storage that is provided integrally (i.e., substantially non-removable) with the server 102 and/or removable storage that is removably connectable to the server 102. Removable storage may include, for example, a port or a drive. A port may include a USB port, a firewire port, and/or other port. A drive may include a disk drive and/or other drive. Electronic storage 117 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 117 may include one or more virtual storage resources (e.g., cloud storage, a virtual private network, and/or other virtual storage resources). Electronic storage 117 may store files, software algorithms, information determined by processor(s) 104, and/or other information that enables the server 102 to function as described herein.

Processor(s) 104 may be configured to provide information-processing capabilities in the server 102. As such, processor(s) 104 may include one or more of a digital processor, an analog processor, a digital circuit designed to process information, an analog circuit designed to process information, a state machine, and/or other mechanisms for electronically processing information. Although the processor(s) 104 are shown in FIG. 1 as single entity within the server 102, this is for illustrative purposes only. In some implementations, the processor(s) 104 may include one or more processing units. These processing units may be physically located within the same device or may represent processing functionality of a plurality of devices operating in coordination.

For example, processor(s) 104 may be configured to execute components 108, 110, 112, 114, and/or 116. Processor(s) 104 may be configured to execute components 108, 110, 112, 114, and/or 116 by software; hardware; firmware; some combination of software, hardware, and/or firmware; and/or other mechanisms for configuring processing capabilities on processor 104. It should be appreciated that, although components 108, 110, 112, 114, and/or 116 are illustrated in FIG. 1 as being co-located within a single processing unit, in implementations in which processor 104 includes multiple processing units, one or more of components 108, 110, 112, 114, and/or 116 may be located remotely from the other components. The description of the functionality provided by the different components 108, 110, 112, 114, and/or 116 described above is for illustrative purposes and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, 116, and/or other components.

Figure 7:
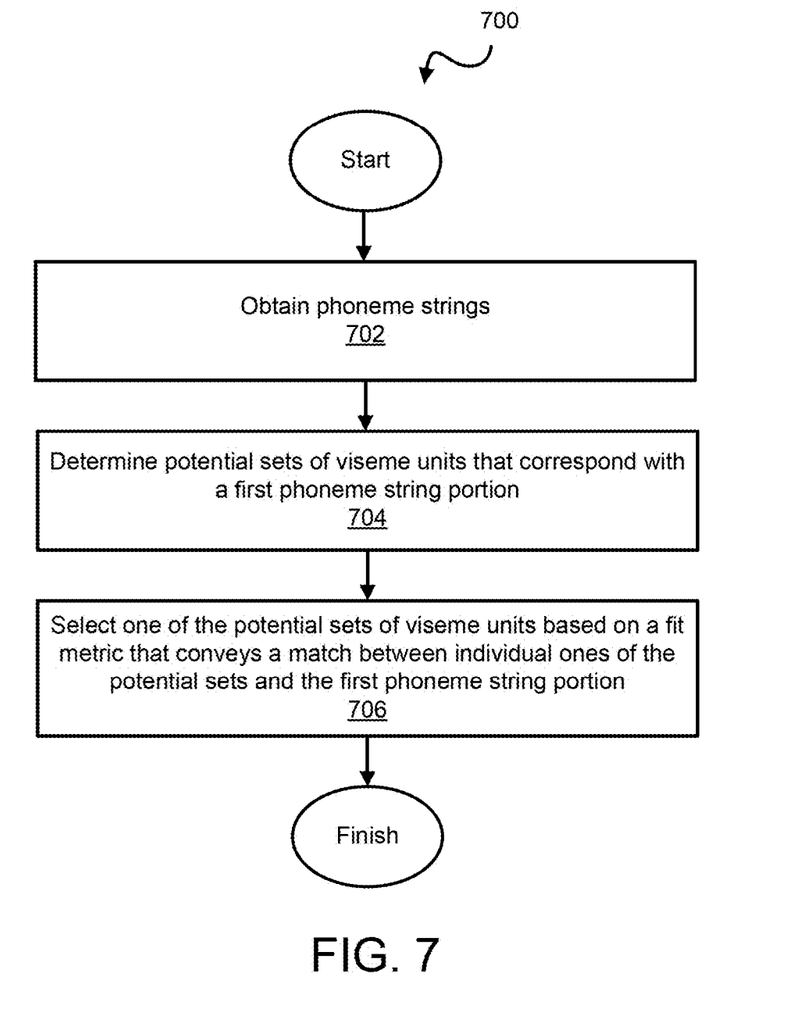
FIG. 7 illustrates a method of speech animation using visemes with phonetic boundary context, in accordance with one or more implementations.

FIG. 7 illustrates an implementation of a method 700 of facilitating speech animation using visemes with phonetic boundary context. The operations of method 700 presented below are intended to be illustrative. In some implementations, method 700 may be accomplished with one or more additional operations not described and/or without one or more of the operations discussed. Additionally, the order in which the operations of method 700 is illustrated in FIG. 7 and described below is not intended to be limiting.

In some implementations, method 700 may be implemented in one or more processing devices (e.g., a computing platform, a digital processor, an analog processor, a digital circuit designed to process information, an analog circuit designed to process information, a state machine, and/or other mechanisms for electronically processing information) and/or one or more other components. The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

Referring now to method 700 in FIG. 7, at an operation 702, phoneme strings may be obtained. By way of non-limiting example, a first phoneme string may be obtained. The first phoneme string may include a first phoneme string portion. In some implementations, operation 702 may be performed by an input component the same as or similar to input component 110 (shown in FIG. 1 and described herein).

At an operation 704, potential sets of viseme units that correspond with the first phoneme string portion may be determined. A viseme unit may comprise an animation that simulates lip movement of an animated entity. Individual ones of the viseme units may correspond to one or both of one or more complete phonemes or one or more phoneme context of one or more complete phonemes. Individual ones of the phoneme context may include a partial phoneme that spans the beginning, middle, or end of a complete phoneme. Individual ones of the potential sets of viseme units that correspond to the first phoneme string portion may form different viseme strings that define different animations of lip movement corresponding to the first phoneme string portion. By way of non-limiting example, a first potential set and a second potential set may correspond with the first phoneme string portion. In some implementations, operation 704 may be performed by a potential set component the same as or similar to potential set component 112 (shown in FIG. 1 and described herein).

At an operation 706, one of the potential sets of viseme units may be selected based on a fit metric. The fit metric may convey a match between individual ones of the potential sets and the first phoneme string portion. In some implementations, operation 706 may be performed by a selection component the same as or similar to selection component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for speech animation using visemes with phonetic boundary context, the system comprising:
 one or more physical processors configured by machine-readable instructions to:

obtain phoneme strings, the obtained phoneme strings including a first phoneme string, the first phoneme string including a first phoneme string portion;

access information defining viseme units, the viseme units comprising animations that simulate lip movement of an animated entity, the viseme units including a first set of viseme units that simulate lip movement for one or more complete phonemes and a second set of viseme units that simulate lip movement for one or more partial phonemes, an individual partial phoneme spanning one of a beginning portion, a middle portion, or an end portion of an individual complete phoneme without inclusion of a remaining part of the individual complete phoneme;

determine potential sets of viseme units that correspond with the first phoneme string portion, wherein different ones of the potential sets of viseme units form different viseme strings that define different animations of lip movement to simulate the first phoneme string portion, the potential sets of viseme units including a first potential set and a second potential set; and select one of the potential sets of viseme units based on a fit metric that conveys a match between individual ones of the potential sets and the first phoneme string portion.

2. The system of claim 1, wherein the one or more physical processors are further configured by machine-readable instructions such that one or more complete phonemes of a viseme unit and/or one or more partial phonemes of a viseme unit are provided as labels associated with the given viseme unit, wherein a label describing whether a phoneme that is adjacent to the one or more complete phonemes is a partial phoneme that spans the beginning, middle, or end of the phoneme conveys a phoneme context of the one or more complete phonemes.

3. The system of claim 2, wherein the one or more physical processors are further configured by machine-readable instructions such that the labels are stored as metadata of the viseme units.

4. The system of claim 1, wherein the one or more physical processors are further configured by machine-readable instructions such that the first potential set is selected over the second potential set based on a first fit associated with the first potential set conveying a better match with the first phoneme string portion than a second fit associated with the second potential set.

5. The system of claim 4, wherein the one or more physical processors are further configured by machine-readable instructions such that the fit metric is associated with an animation cost, such that selecting the first potential set over the second potential set is based on a first animation cost for animating lip movement using the first potential set being lower than a second animation cost for animating lip movement using the second potential set.

6. The system of claim 1, wherein the one or more physical processors are further configured by machine-readable instructions to:

effectuate presentation of a first animation including a first animation entity, the first animation including animated lip movement defined at least in part by a selected one of the first potential set or the second potential set; and synchronize the lip movement of the first animation entity with audio corresponding to the first phoneme string portion during presentation of the first animation.

7. The system of claim 1, wherein the one or more physical processors are further configured by machine-readable instructions such that animation of lip movement corresponding to the complete first phoneme string is defined by a first viseme string, the first viseme string including a first viseme string portion corresponding to lip animation of the first phoneme string portion, wherein the first viseme string portion includes a selected one of the first potential set or second potential set.

8. The system of claim 2, wherein the one or more physical processors are further configured by machine-readable instructions such that:

the first phoneme string portion comprises a first phoneme, a second phoneme, and a third phoneme; and the first potential set comprises a first viseme unit and a second viseme unit, wherein the first viseme unit corresponds to the complete first phoneme and first phoneme context of the complete first phoneme, and wherein the second viseme unit corresponds to the complete third phoneme and second phoneme context of the complete third phoneme.

9. The system of claim 8, wherein the one or more physical processors are further configured by machine-readable instructions such that the first phoneme context is a first part of the second phoneme and the second phoneme context is a second part of the second phoneme.

10. The system of claim 8, wherein the one or more physical processors are further configured by machine-readable instructions such that the first phoneme string portion is a triphone that sequentially includes the first phoneme, the second phoneme, and the third phoneme.

11. The system of claim 1, wherein the one or more physical processors are further configured by machine-readable instructions such that the phoneme strings are determined from spoken user utterances.

12. The system of claim 1, wherein the one or more physical processors are further configured by machine-readable instructions such that the phoneme strings are determined from text strings.

13. The system of claim 1, wherein the one or more physical processors are further configured by machine-readable instructions such that:

the first phoneme string portion comprises a first phoneme; and the first potential set comprises a first viseme unit, wherein the first viseme unit corresponds to at least part of the first phoneme.

14. A method speech animation using visemes with phonetic boundary context, the method being implemented in a computer system including one or more physical processors and storage media storing machine-readable instructions, the method comprising:

obtaining phoneme strings, including obtaining a first phoneme string, the first phoneme string including a first phoneme string portion;

accessing information defining viseme units, the viseme units comprising animations that simulate lip movement of an animated entity, the viseme units including a first set of viseme units that simulate lip movement for one or more complete phonemes and a second set of viseme units that simulate lip movement for one or more partial phonemes, an individual partial phoneme spanning one of a beginning portion, a middle portion, or an end portion of an individual complete phoneme without inclusion of a remaining part of the individual complete phoneme;

determining potential sets of viseme units that correspond with the first phoneme string portion, wherein different ones of the potential sets of viseme units form different viseme strings that define different animations of lip movement to simulate the first phoneme string portion, including determining a first potential set and a second potential set; and selecting one of the potential sets of viseme units based on a fit metric that conveys a match between individual ones of the potential sets and the first phoneme string portion.

15. The method of claim 14, wherein the one or more complete phonemes and/or one or more partial phonemes of a given viseme unit are provided as labels associated with the given viseme unit, wherein a label describing whether a phoneme that is adjacent to one or more complete phonemes is a partial phoneme that spans the beginning, middle, or end of the phoneme conveys a phoneme context of the one or more complete phonemes.

16. The method of claim 15, wherein the labels are stored as metadata of the viseme units.

17. The method of claim 14, wherein the first potential set is selected over the second potential set based on a first fit associated with the first potential set conveying a better match with the first phoneme string portion than a second fit associated with the second potential set.

18. The method of claim 17, wherein the fit metric is associated with an animation cost, such that selecting the first potential set over the second potential set is based on a first animation cost for animating lip movement using the first potential set being lower than a second animation cost for animating lip movement using the second potential set.

19. The method of claim 14, further comprising:

effectuating presentation of a first animation including a first animation entity, the first animation including animated lip movement defined at least in part by a selected one of the first potential set or the second potential set; and synchronizing the lip movement of the first animation entity with audio corresponding to the first phoneme string portion during presentation of the first animation.

20. The method of claim 14, wherein animation of lip movement corresponding to the complete first phoneme string is defined by a first viseme string, the first viseme string including a first viseme string portion corresponding to lip animation of the first phoneme string portion, and wherein the first viseme string portion includes a selected one of the first potential set or second potential set.

21. The method of claim 15, wherein:

the first phoneme string portion comprises a first phoneme, a second phoneme, and a third phoneme; and the first potential set comprises a first viseme unit and a second viseme unit, the first viseme unit corresponding to the complete first phoneme and first phoneme context of the complete first phoneme, the second viseme unit corresponding to the complete third phoneme and second phoneme context of the complete third phoneme.

22. The method of claim 21, wherein the first phoneme context is a first part of the second phoneme and the second phoneme context is a second part of the second phoneme.

23. The method of claim 21, wherein the first phoneme string portion is a triphone that sequentially includes the first phoneme, the second phoneme, and the third phoneme.

24. The method of claim 14, wherein the phoneme strings are determined from spoken user utterances.

25. The method of claim 14, wherein the phoneme strings are determined from text strings.

26. The method of claim 14, wherein the first phoneme string portion comprises a first phoneme, and the first potential set comprises a first viseme unit, wherein the first viseme unit corresponds to at least part of the first phoneme.

* * * * *